May 28, 1929.  S. B. WINN  1,715,263
LOCKING DEVICE FOR REVERSIBLE TRAILERS
Filed Oct. 25, 1926  3 Sheets-Sheet 2
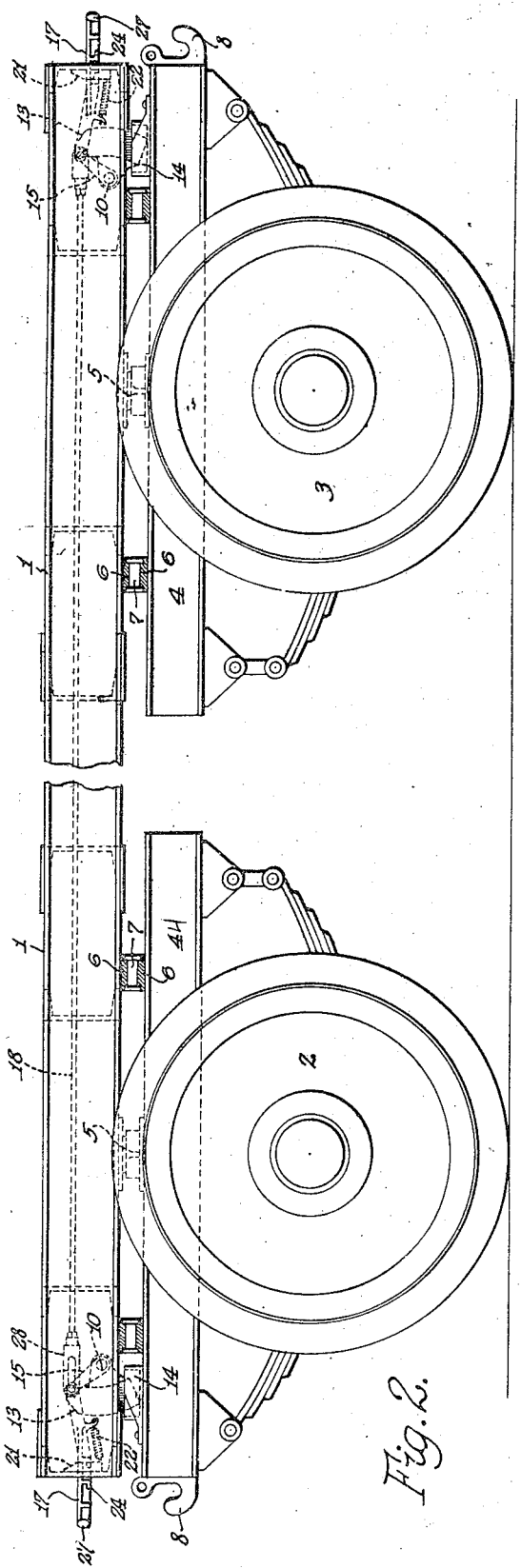
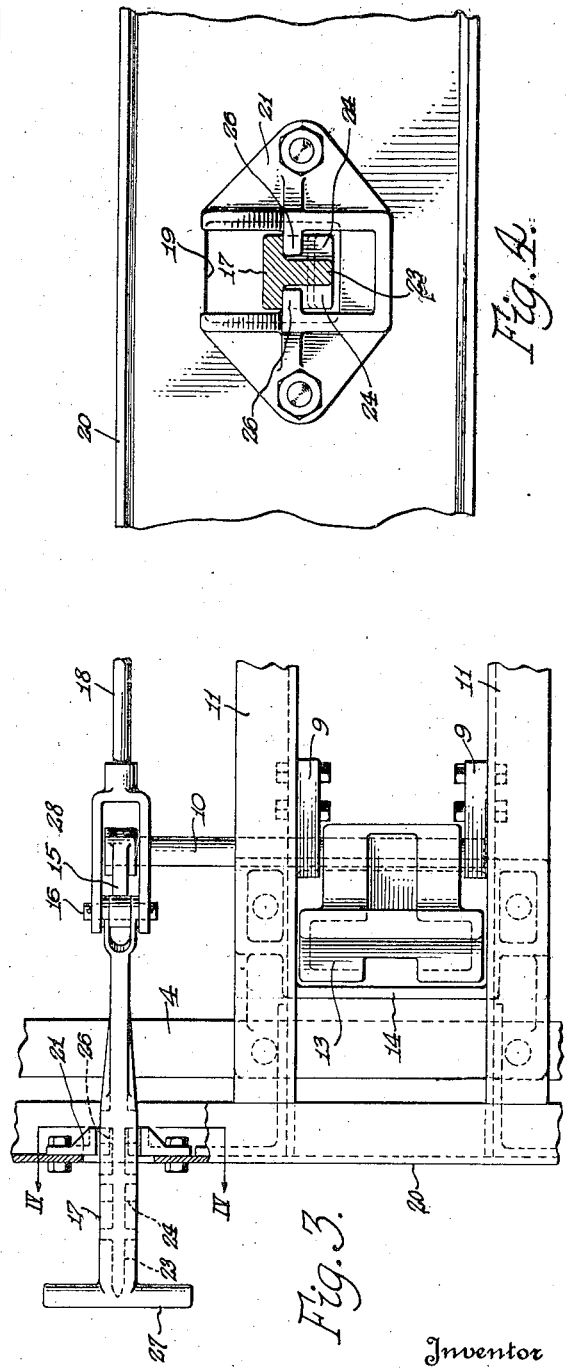
Inventor
Sidney B. Winn,
By
Attorneys May 28, 1929.  S. B. WINN  1,715,263
LOCKING DEVICE FOR REVERSIBLE TRAILERS
Filed Oct. 25, 1926  3 Sheets-Sheet 3
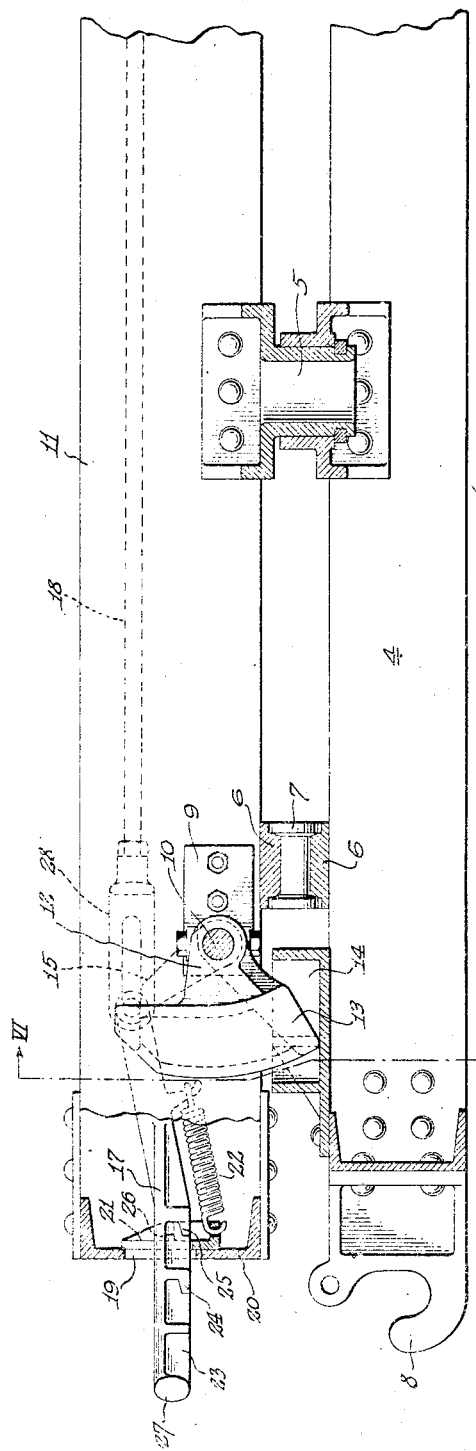
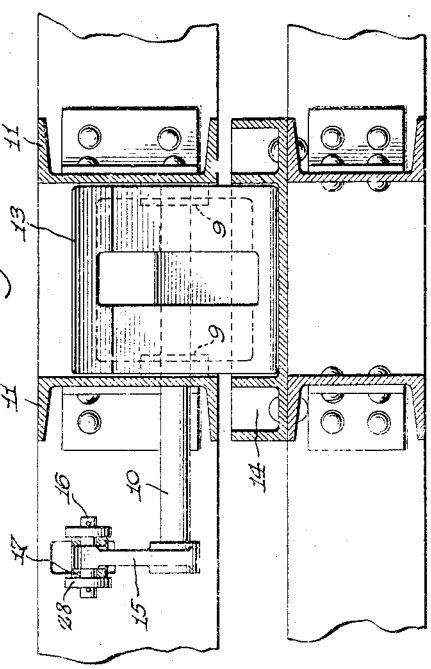
Inventor
Sidney B. Winn,
By
Attorneys Patented May 28, 1929.

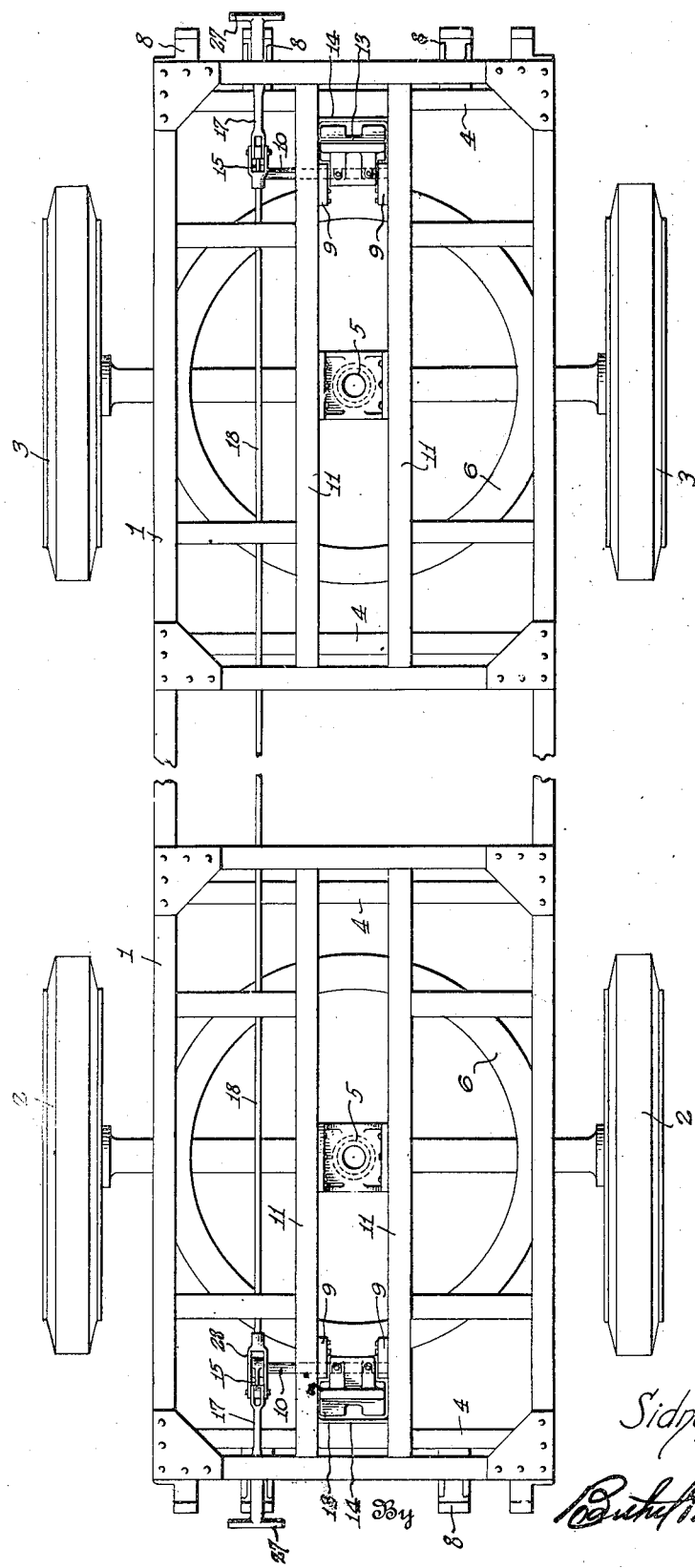

1,715,263

UNITED STATES PATENT OFFICE.

SIDNEY B. WINN, OF LAPEER, MICHIGAN.

LOCKING DEVICE FOR REVERSIBLE TRAILERS.

Application filed October 25, 1926. Serial No. 144,012.

My invention aims to provide a locking device for reversible trailers or other vehicles that may be towed from either end, by a tractor or towing vehicle. The reversible trailer includes swiveled trucks or axle assemblies to either of which a towing vehicle may be attached. It is desirable to leave the attached truck or axle assembly free from a swivel or fifth wheel action, and lock or otherwise secure the other truck or axle assembly so that it cannot swivel or turn, but must remain in an operative position in the direction of travel of the trailer. In order that either of the trucks may be optionally fixed, at will, relative to the trailer, to render either truck inactive against a swivel movement, a locking mechanism is used on the trailer chassis, operatable at either end of the chassis for locking either of the trucks, or both, relative to the chassis.

There are many advantages gained by the use of a reversible trailer, that is, one that may be towed and guided from either end. To do this it is necessary that the trailer have swiveled trucks. Such trucks are a distinct advantage in placing the trailer in a desired position, but more particularly in permitting the trailer being towed from either end or used in a train formation. By locking both trucks under the trailer against a swivel action a towing or pushing vehicle may move the trailer in a straight line.

The locking mechanism includes chassis members engageable or disengageable with chassis supporting swiveled trucks, to hold the trucks in substantial longitudinal alinement with the chassis, and the chassis members are connected in a manner that permits of the members being alternately actuated to render one member active and the other inactive, or both members active, as ocassion may require. This locking mechanism will be hereinafter specifically described and then claimed, and reference will now be had to the drawings wherein Figure 1 is a plan of a reversible trailer with its central portion broken away and its end portions equipped with the locking device;

Fig. 2 is a side elevation of the same showing both trucks locked relative to the trailer chassis;

Fig. 3 is an enlarged plan of an end portion of the trailer;

Fig. 4 is a cross sectional view taken on the line IV—IV of Fig. 3;

Fig. 5 is an enlarged longitudinal sectional view showing an active position of the locking device;

Fig. 6 is a cross sectional view taken on the line VI—VI of Fig. 5.

In the drawings, 1 generally denotes a vehicle frame, for instance a trailer chassis and the ends of this frame are adapted to be supported by swiveled or fifth wheel action trucks, generally designated 2 and 3. Each truck includes an axle assembly, wheels, spring suspension and truck frame. Since these truck frames are important elements of my invention I have designated the same 4. Each truck frame has a conventional form of swivel or king pin connection with the frame 1 and this connection is generally designated 5. In addition to the swivel or pivotal connection 5 there are fifth wheel members 6 and anti-frictional rollers 7 may be interposed between said members. The fifth wheel members cooperate with the swivel connection 5 in maintaining the vehicle frame 1 substantially horizontal relative to the truck frame 4, prevent displacement of the truck frames relative to the vehicle frame, and permit of the trucks 2 and 3 moving the frame in a desired direction.

On the outer ends of the truck frames 4 are couplings or connections 8 by which a tractor or towing vehicle may be connected to either truck for moving the vehicle or trailer in a desired direction. Since the towing vehicle may be connected to either end of the trailer or towed vehicle I consider the trailer to be reversible and use this term in such sense. If either truck may be towed it is desirable, if not actually necessary to lock one or both of said trucks against turning movement relative to the trailer chassis. In some instances both trucks may be held against any swivel action and in other instances one or the other of said trucks will be locked. For this purpose a novel locking device is installed at the ends of the trailer chassis with said locking devices interconnected so that one or the other of said devices, sometimes both, will be in active positions, thus more or less rendering the arrangement fool proof to avoid any accident incident to a truck being free for a swivel action when it should not have such freedom of movement.

On suitable longitudinal members or supports 11 in each end of the trailer frame 1 are placed bearings 9 for a rock shaft 10. Suitably mounted on the rock shaft, between the bearings 9, is the crank portion 12 of a wide hollow locking member 13 substantially segment shaped in elevation so that it will extend upwardly between the members 11 and have a substantial side wall relation with the members 11, as best shown in Fig. 5. The member 13 is also adapted to extend below the plane of the trailer chassis and into a socket member 14 mounted on the truck frame 4. The socket member 14 may be of any suitable configuration to receive and retain the locking member 13 against lateral movement whereby the locking member will establish a rigid connection between the truck frame and the chassis to prevent turning of the former relative to the latter.

On each of the rock shafts 10 is a crank 15 having its outer end provided with a long pin connection 16 whereby it may be operatively connected to a latch bar 17 and a coupling rod 18 extending lengthwise of the trailer chassis and connecting the locking devices together.

The latch bar 17 extends through openings 19 provided therefor in transverse end or sill members 20 of the trailer chassis 1. Suitably attached to each end or sill member 20 is a keeper 21 and each keeper is connected to each latch bar by a coiled retractile spring 22. The retractile force of each spring will retain its latch bar 17 normally in engagement with the keeper and said latch bar is designed so that it may be placed in different positions. As best shown in Fig. 4, the latch bar has a T cross section with its center web 23 provided with substantially hook shaped side lugs 24 and 25. These lugs being in sets are adapted to engage under lateral lips 26 of the keeper and will be held in such engagement by the spring 22 connecting the keeper and latch bar. On the outer end of the latch bar is a handle 27 by which it may be conveniently moved and this handle will permit of the latch bar being reciprocated or otherwise shifted in the opening 19 to effect latching or unlatching of the bar relative to its keeper. As shown in Fig. 5 the locking member 13 is held in an active position in the socket member 14 to prevent turning of the truck frame 4 relative to the trailer chassis 1. By pushing forwardly on the latch bar, against the action of the spring 22, the shaft 10 may be rocked to swing the locking member 13 upwardly between the trailer members 11 and clear of the socket member 14, whereby the truck frame 4 may have a turning movement relative to the end portion of the trailer chassis. This raised or inactive position of the locking member 13 may be maintained by placing the set of lugs 24 in engagement with the lips 26 of the keeper; the retractile force of the spring 22 maintaining such engagement.

In order that unlocking of one of the locking members 13 may be effected without disturbing the condition of the other locking member, the connecting rod 18 has a longitudinally slotted head or link 28 at one end thereof only and as shown in the drawings this link connection is associated with the locking member of the truck 2 and in consequence thereof the truck 2 may be released for a turning or swivel action and the truck 3 maintained locked relative to the trailer chassis. Such would be the operative condition of the locking devices if the towing vehicle is coupled to the truck 2 because said truck could then turn for proper guidance or movement of the trailer.

If the towing vehicle is to be coupled, to the truck 3 then the locking member 13 of the truck 3 is raised by pushing the latch bar 17 inwardly and setting it in locked engagement with its keeper. Inward movement of the latch bar 17 at its ends of the trailer will shift the connecting rod 18, but by virtue of its slotted or link connection with the locking device of the truck 2, the locked condition of the truck 2 will not be changed.

As shown in Fig. 2, both locking devices are active holding the trucks 2 and 3 against turning movement relative to the trailer chassis. This condition is desirable for a trailer that is to be moved in a straight line and when both locking devices are active, either may be rendered inactive without affecting the other. If the truck 2 is released for turning movement the pin connection 16 assumes a position in the slotted head 28 that locks the connecting rod 18 against longitudinal movement whereby the locking device at the opposite end of the trailer cannot be actuated to release the truck 3 for turning movement relative to the trailer chassis, so releasing of the truck 2 for turning movement conditions the locking device of the truck 3 so that it cannot be actuated until the locking device at the opposite end of the trailer chassis is actuated to place the truck 2 in a nonturning relation to the trailer chassis. This is the fool proof feature of the locking devices and prevents the trailer from being used with both trucks free to turn. If such were possible an accident might occur.

Three possible conditions of the trucks 2 and 3 are thus provided, viz: truck 2 free and truck 3 locked, truck 2 locked and truck 3 free, and both of the trucks locked. In Figure 2 the latter condition is illustrated, both bars 17 then being in position with the lugs 25 in engagement with lips 26 of the keepers; in this position of the bars, the crank 15 of the shaft 10 for truck 2 is at the outer end of the slot 16, a position which permits either bar 17 to be manipulated without affecting the position of the locking bar for the other truck. For instance, movement of the bar 17 for truck 2 will cause the crank to be moved in the slot, while manipulation of the bar 17 for truck 3 will cause the rod 18 to move the walls of the slot 16 relative to the crank; in the former case truck 2 is freed while truck 3 remains locked, while in the latter case truck 3 is freed and truck 2 remains locked. In either of the latter positions, the crank of the mechanism for truck 2 is at the inner end of the slot 16, with the result that the bar of the locked truck cannot be moved to release that truck without a movement of the bar of the free truck in the direction to lock the latter truck; however, in either of such positions, it will be understood that the bar of the free truck can be moved in the direction to lock that truck without affecting the locked condition of the locked truck, such movement restoring the parts to the position shown in Figure 2.

All of this is suggestive of having the locking devices controlled from a towing vehicle and it may be desirable in order that the towing vehicle could better manipulate the towed vehicle to place the same in a desired position. If so, any suitable connection may be made with either of the latch bars 17.

What I claim is:—

1. In reversible trailer structures, wherein the trailer chassis is supported by a pair of dirigible wheeled units to permit either end of the trailer to form the advance end of the trailer for draft purposes, mechanism carried by and individual to each unit by which the draft can be applied to the trailer, and means for preventing dirigible movement of both units concurrently, said means being operative at will to permit dirigible movement of either unit while maintaining the other unit against dirigibility or to maintain both units against dirigibility.

2. A structure as in claim 1 characterized in that the means is relatively arranged in such manner that with both units held against dirigible movement either unit may be released for dirigible movement without effecting release of the companion union from its locked condition.

3. A structure as in claim 1 characterized in that the means is relatively arranged in such manner that with either unit free for dirigible movement means manipulation to render the non-dirigible unit dirigible is operable solely by concurrently rendering the companion dirigible unit non-dirigible.

4. A structure as in claim 1 characterized in that the means is relatively arranged in such manner that with either unit free for dirigible movement means manipulation to render the non-dirigible unit dirigible is operable solely by concurrently rendering the companion dirigible unit non-dirigible, said means being operative to render the dirigible unit non-dirigible while maintaining the non-dirigible condition of the companion unit.

5. Means as in claim 1 characterized by locking mechanisms individual to the units for locking the selected unit to the trailer chassis to prevent dirigibility of the locked unit, the locking mechanisms being operatively connected within the planes of the trailer chassis.

6. Means as in claim 1 characterized by locking mechanisms individual to the units for locking the selected unit to the trailer chassis to prevent dirigiblity of the locked unit, the locking mechanisms being operatively connected within the planes of the trailer chassis, with the connections including a lost-motion formation operative in presence of locked conditions of both units to permit release of either unit for dirigiblity while maintaining the locked condition of the companion unit.

7. Means as in claim 1 characterized by pivoted locking members carried by the chassis and individual to the units, each member being swingable into and out of engagement with its unit at will.

8. Means as in claim 1 characterized by pivoted locking members carried by the chassis and individual to the units, each member being swingable into and out of engagement with its unit at will, with the members operatively connected in a manner to prevent location of both members in disengaged positions concurrently.

9. Means as in claim 1 characterized by pivoted locking members carried by the chassis and individual to the units, each member being swingable into and out of engagement with its unit at will, with the members operatively connected in a manner to prevent location of both members in disengaged positions concurrently while permitting either member to be swung to its disengaged position at will.

10. Means as in claim 1 characterized by pivoted locking members carried by the chassis and individual to the units, each member being swingable into and out of engagement with its unit at will, the members being operatively connected in a manner to permit a member to swing between its engaged and disengaged positions when the companion member is in engaged position and prevent movement of such companion member to its disengaged position while the first member is disengaged.

11. Means as in claim 1 characterized by pivoted locking members carried by the chassis and individual to the units, each member being swingable into and out of engagement with its unit at will, the members being operatively connected in a manner to permit a member to swing between its engaged and disengaged positions when the companion member is in engaged position, movement of such companion member to disengaged position being dependent on location of the first member in its engaged position.

12. Means as in claim 1 characterized by locking devices individual to each unit with each device including a swingable locking member carried by the chassis and adapted to engage and disengage its unit, and a manually-operable latch-bar for swinging the member between its positions and for maintaining the member locked in either of its positions.

13. Means as in claim 1 characterized by locking devices individual to each unit with each device including a swingable locking member carried by the chassis and adapted to engage and disengage its unit, a manually-operable latch-bar for swinging the member between its position and for maintaining the member in either of its positions, a keeper through which the latch-bar extends, and a spring operative to normally hold the latch bar in engagement with its keeper.

In testimony whereof I affix my signature.

SIDNEY B. WINN.